(12) United States Patent
Nicholas

(10) Patent No.: US 12,427,827 B1
(45) Date of Patent: *Sep. 30, 2025

(54) VELOCITY DEPENDENT AIR SPRING

(71) Applicant: Fox Factory, Inc., Duluth, GA (US)

(72) Inventor: Edwin Blake Nicholas, Elbert, CO (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/010,188

(22) Filed: Jan. 6, 2025

Related U.S. Application Data

(63) Continuation of application No. 18/617,469, filed on Mar. 26, 2024.

(51) Int. Cl.
B60G 17/052 (2006.01)

(52) U.S. Cl.
CPC .... *B60G 17/0528* (2013.01); *B60G 2202/152* (2013.01); *B60G 2500/2042* (2013.01)

(58) Field of Classification Search
CPC .......... B60G 17/0528; B60G 2202/152; B60G 2500/2042
See application file for complete search history.

(56) References Cited

U.S. PATENT DOCUMENTS

| 8,894,050 B2 | 11/2014 | Wootten et al. |
| 11,376,913 B2 | 7/2022 | Barefoot et al. |
| 12,220,962 B1 * | 2/2025 | Nicholas ................... F16F 9/44 |

FOREIGN PATENT DOCUMENTS

CN 115489249 A 12/2022

* cited by examiner

*Primary Examiner* — Faye M Fleming

(57) ABSTRACT

A velocity dependent flow control unit for an air spring. The velocity dependent flow control unit including a compression fluid pathway with a one-way valve and a rebound fluid pathway with a one-way valve. The velocity dependent flow control unit can be fixed and coupled between two additional air chambers of the air shock. A spring curve of said air shock can be dependent upon a velocity of a compression of the air shock and can be controlled by a flow rate of a fluid passing the two additional chambers and the velocity dependent flow control unit.

20 Claims, 16 Drawing Sheets

VELOCITY DEPENDENT AIR SPRING

CROSS REFERENCE

This application is a Continuation application and claims priority to and benefit of co-pending U.S. patent application Ser. No. 18/617,469 filed on Mar. 26, 2024, entitled "VELOCITY DEPENDENT AIR SPRING" by Edwin Blake Nicholas and assigned to the assignee of the present application, the disclosure of which is hereby incorporated herein by reference in its entirety.

FIELD OF THE INVENTION

Embodiments of the invention generally relate to a velocity dependent flow control unit for an air spring.

BACKGROUND

Shock assemblies (e.g., dampers, shock absorbers, springs etc.) are used in numerous different vehicles and configurations to absorb some or all of a movement that is received at an unsprung portion of a vehicle before it is transmitted to a suspended portion of the vehicle. For example, when a wheel hits a pothole, the encounter will cause an impact force on the wheel. However, by utilizing suspension components including one or more shock assemblies, the impact force can be significantly reduced or even absorbed completely before it is transmitted to a person on a seat of the vehicle. However, depending upon the terrain being traversed, it can be valuable to be able to change the amount of shock absorption provided by the shock assembly, including changing the type of springs, for personal comfort, vehicle performance, and the like.

BRIEF DESCRIPTION OF THE DRAWINGS

Aspects of the present invention are illustrated by way of example, and not by way of limitation, in the accompanying drawings, wherein.

Figure 1A:
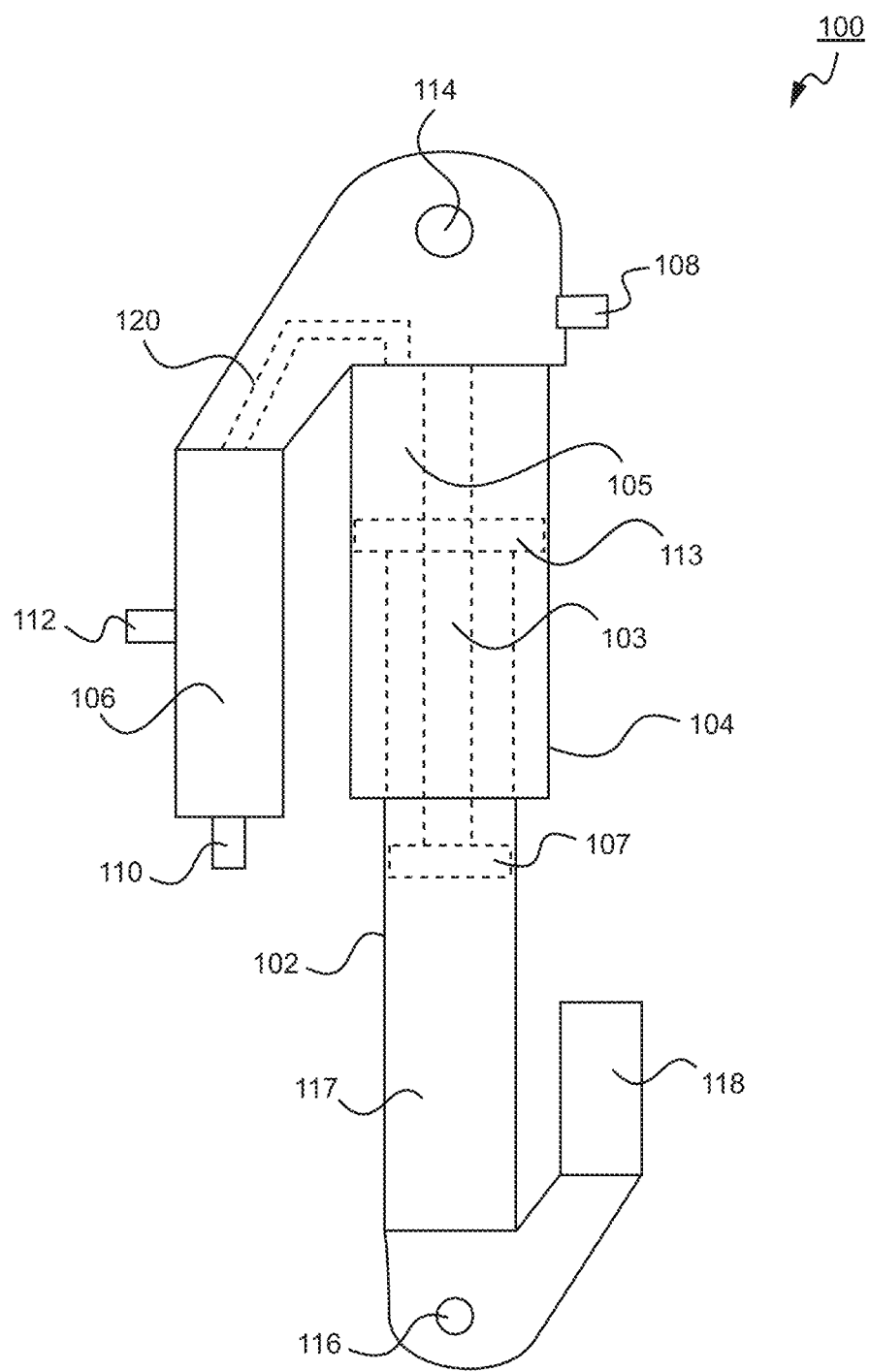
FIGS. 1A and 1B are side views of an air shock, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). A vehicle utilizing a suspension system can have one or more air shocks. The vehicle may be a wheeled vehicle or any other type of vehicle including snowmobiles. Implementations of the present invention other than vehicles may include, but are not limited to, an exoskeleton, a seat frame, a prosthetic, a suspended floor, a door opening/closing damper, a lift assist damper, or any other application where a controlled compression and/or rebound of a suspension/damper is desired. However, in the following discussion, and for purposes of clarity, a vehicle may be described.

A conventional air shock typically operates like a conventional shock and generates a damping force which increases as the piston moves farther into the damping chamber. Thus, in a conventional air shock, the damping force is "position dependent". A position dependent air shock may also be described as having a progressive spring curve. Thus, when the damper is in a nearly fully extended state (i.e., the piston is not located deeply within the damper chamber) a conventional air shock will provide the least damping force. Conversely, when the damper is in a nearly fully compressed state (i.e., the piston is located deeply within the damper chamber) a conventional air shock will provide the greatest damping force. As a result, if such a damper is in a nearly fully extended state and encounters a significant compressive event, the conventional air shock may not provide the desired or necessary damping force.

In contrast, the velocity dependent air shock of the present invention is able to change the spring curve of the air shock dependent upon the velocity of the piston relative to a lower body portion traveling within the main damper portion. Thus, the velocity dependent air shock can have a first spring curve for an impact with a first velocity and a second spring curve for an impact with a second velocity. For example, a small bump or small compression event may cause the lower body portion to travel within the main damper portion past the piston at a first velocity. Moreover, a large or abrupt compression event may cause a lower body portion of the air shock to move relative to a piston and to travel within the main damper portion at a second velocity which is greater than the first velocity. In one embodiment of the present invention, the velocity dependent air shock will produce an approximately linear spring curve during lower velocity events, and, beneficially, the velocity dependent air shock will produce a more progressive spring curve during higher velocity events. As will be described in detail below, in embodiments of the present invention, the spring curve of present air shock is dependent on the velocity of the lower body portion relative to the piston rather than the position of the piston within the lower body portion.

Velocity Dependent Flow Control Unit

Figure 1B:
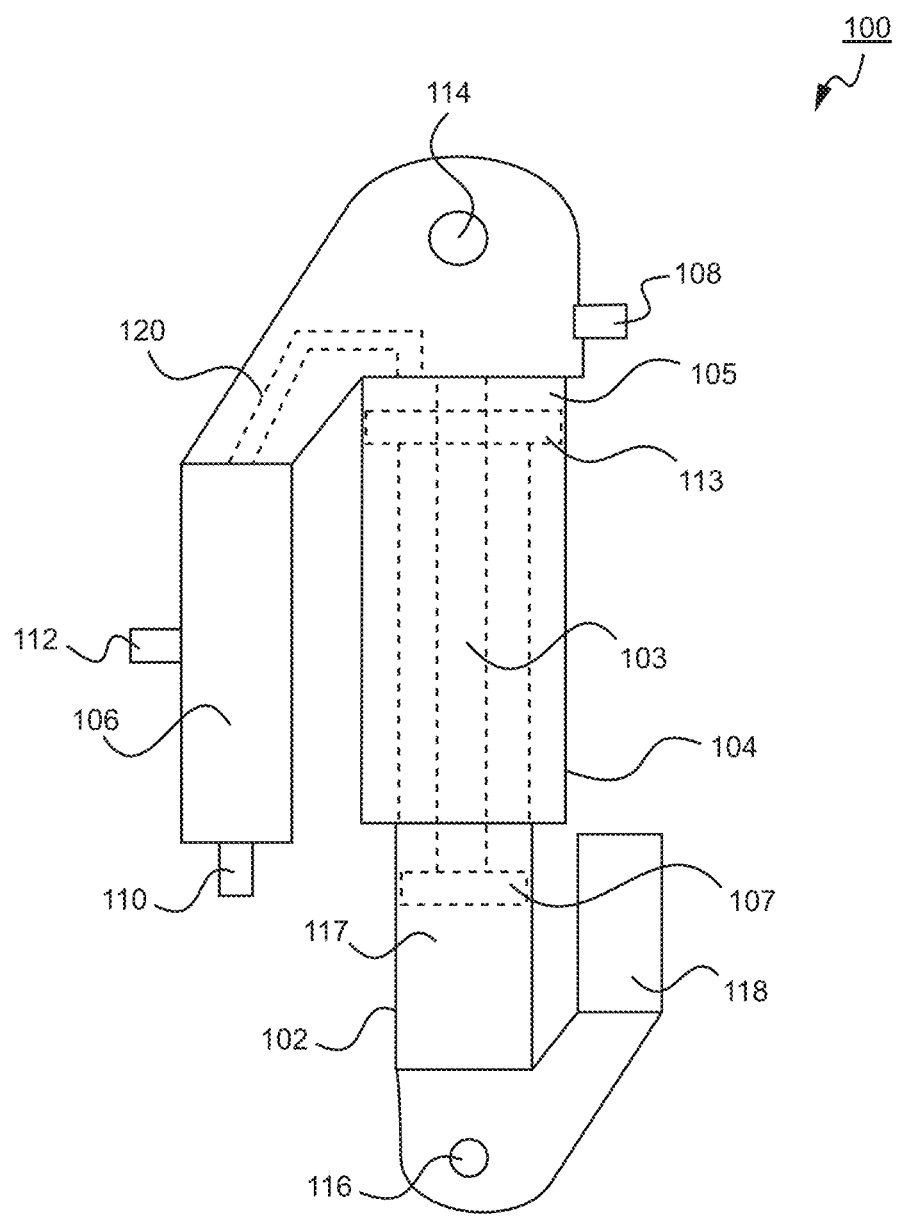

With reference now to FIGS. 1A and 1B, a side view of an air shock 100 is provided. Air shock 100 includes a lower body portion 102, a shaft 103, a main damper portion 104, a main gas chamber 105, a gas extra volume reservoir 106, a dampening fluid piston 107, a gas valve 108, a gas valve 110, an adjustment knob 112, a main gas chamber isolator 113, an eyelet mount 114, an eyelet mount 116, damper fluid 117, and a displaced fluid reservoir 118. In the present invention, during operation of air shock 100, lower body portion 102 will move into or out of main damper portion 104. For example, when air shock 100 is installed on a vehicle and the vehicle encounters a bump or other obstacle, lower body portion 102 travels into main damper portion 104.

Shaft 103 can be fixed or coupled to a component of air shock 100 such as eyelet mount 114 or main damper portion 104. Dampening fluid piston 107 can be located at a distal end of shaft 103. In one embodiment, when lower body portion 102 travels into main damper portion 104, the dampening fluid piston 107 remains stationary or fixed relative to main damper portion 104. Thus, the velocity of a compression event for air shock 100 can be defined as the velocity at which lower body portion 102 moves relative to dampening fluid piston 107 during the compression event. Displaced fluid reservoir 118 may be in fluid communication with damper fluid 117 housed in lower body portion 102. While lower body portion 102 moves relative to dampening fluid piston 107 during a compression event, dampening fluid piston 107 forces or displaces damper fluid 117 into displaced fluid reservoir 118. Damper fluid 117 can be non-compressible and can be a fluid such as an oil. Displaced fluid reservoir 118 can include a fluid filled portion and a gas filled portion separated by a floating piston that movably seals the fluid filled portion from the gas filled portion of and can move during compression and rebound events. During a rebound event, lower body portion 102 can move relative to dampening fluid piston 107 and extend out of main damper portion 104 while dampening fluid piston 107 remains fixed.

Main gas chamber isolator 113 can be positioned at and coupled to an end of lower body portion 102 and be located within main damper portion 104. During a compression event main gas chamber isolator 113 moves with lower body portion 102 further into main damper portion 104 and creates less volume or space in main gas chamber 105. The less volume compresses the gas in main gas chamber 105. During a rebound event, main gas chamber isolator 113 moves with lower body portion 102 in a downward direction closer to dampening fluid piston 107 and the gas in main gas chamber 105 decompresses. FIG. 1A depicts air shock 100 in a nearly fully extended state where lower body portion 102 is extended out main damper portion 104. The nearly fully extended state can occur immediately after a rebound event. FIG. 1B depicts air shock 100 in a nearly fully compressed state where lower body portion 102 has entered main damper portion 104. The nearly fully compressed state can occur immediately after a compression event.

Main damper portion 104 can house main gas chamber 105 that has a volume capable of holding a volume of gas. The volume of gas can be increased by adding an additional chamber in fluid communication with main gas chamber 105. For example, extra volume reservoir 106 may include an additional chamber in fluid communication with main gas chamber 105 via pathway 120. Extra volume reservoir 106 may include two additional chambers. The two additional chambers may be coupled together via a velocity dependent flow control unit of the present invention. In one embodiment, the velocity dependent flow control unit can be adjusted via an adjustment knob 112. It should be appreciated that adjustment knob 112 can be located in positions other than what is depicted in FIG. 1A. Gas valve 110 can be employed to add or remove air from an additional chamber in extra volume reservoir 106. In one embodiment, adjustment knob 112 can be located at the distal end of extra volume reservoir 106 where gas valve 110 is located and gas valve 110 can be located at the side of extra volume reservoir 106. Gas valve 108 can be used to add or remove gas from main gas chamber 105. In one embodiment, gas valve 108 and gas valve 110 are Schrader valves. Air shock 100 can also include eyelet mount 114 and eyelet mount 116 which can be used to couple air shock 100 to a vehicle such as a snowmobile.

Figure 2:
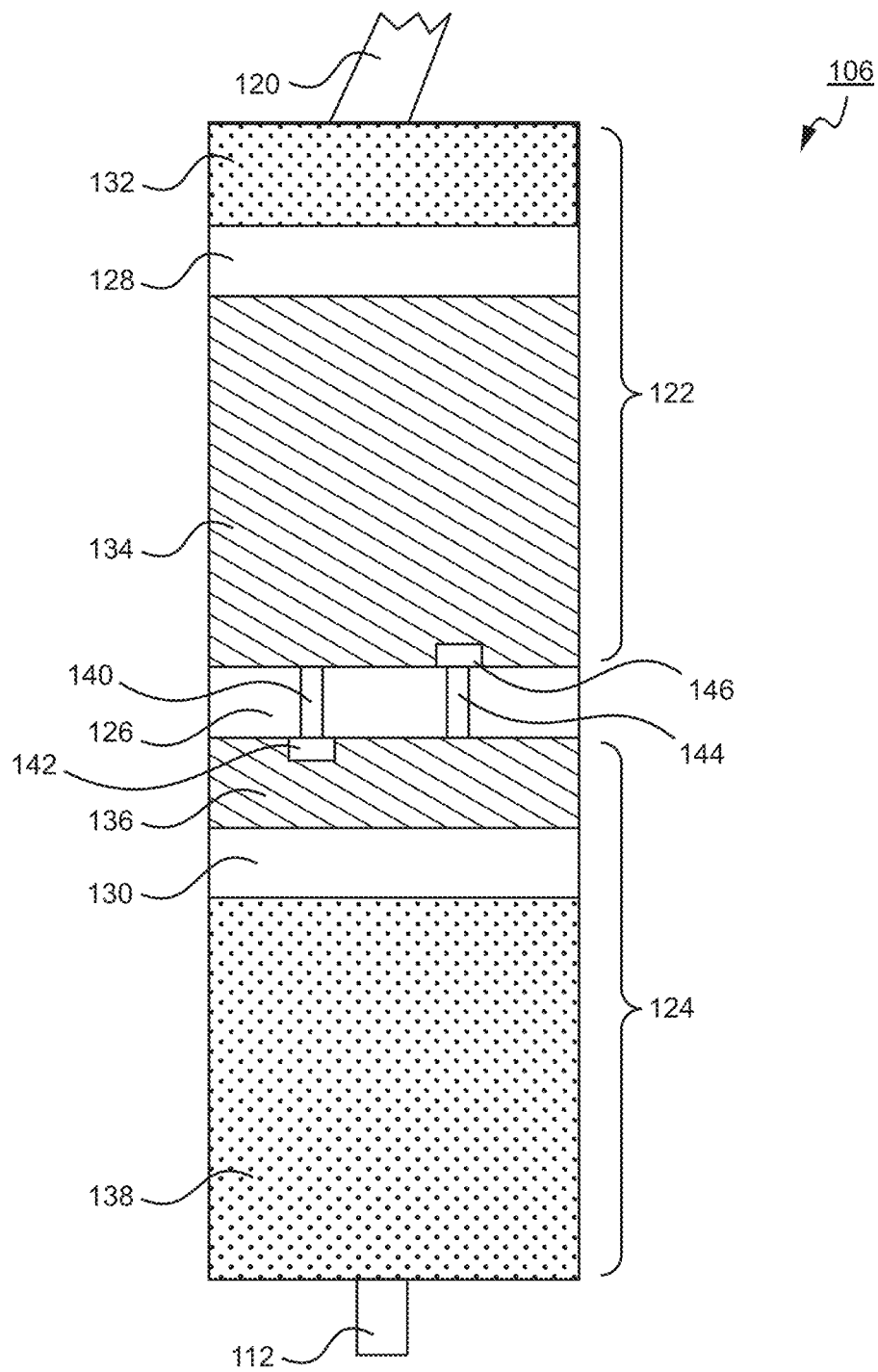
FIG. 2 is a cross section view of a reservoir, in accordance with an embodiment.

With reference now to FIG. 2, a cross section view of extra volume reservoir 106 of FIG. 1A. FIG. 2 depicts extra volume reservoir 106 with a first additional chamber 122, a second additional chamber 124, and a velocity dependent flow control unit 126 that is fixed and coupled in between. First additional chamber 122 can include a floating piston 128 and second additional chamber 124 can include a floating piston 130. Floating piston 128 and floating piston 130 can be internal floating pistons that movably seal a fluid filled portion from a gas filled portion of a chamber. For example, floating piston 128 can separate gas filled portion 132 from a fluid filled portion 134 in first additional chamber 122. Floating piston 130 can separate fluid filled portion 136 from gas fill portion 138 in second additional chamber 124. It should be appreciated that as gas pressure increases in a gas filled section, a floating piston can move and create more pressure on an adjacent oil filled portion.

For example, during a compression event, as lower body portion 102 moves relative to dampening fluid piston 107 and into main damper portion 104, main gas chamber isolator 113 moves to increase gas pressure in main gas chamber 105. This may increase pressure in gas filled portion 132 which is in fluid communication with main gas chamber 105 via pathway 120. The increased gas pressure in gas filled portion 132 can cause floating piston 128 to move downwards towards second additional chamber 124. The movement of floating piston 128 can result in increased pressure in fluid filled portion 134 which can cause the fluid to pass through compression pathway 140 and one-way valve 142 of velocity dependent flow control unit 126 and into fluid filled portion 136 causing an increase of pressure in fluid filled portion 136. The pressure in fluid filled portion 134 can cause one-way valve 142 to open. The increase in fluid pressure in fluid filled portion 136 can cause floating piston 130 to move downward to toward adjustment knob 112 causing an increase in pressure in gas filled portion 138.

After gas filled portion 138 has been pressurized or compress, gas filled portion 138 can decompress and cause a rebound event for air shock 100. The rebound event can cause floating piston 130 to move upward causing fluid in fluid filled portion 136 to increase and close one-way valve 142. The pressure can cause the fluid to move through rebound pathway 144 and open one-way valve 146 of velocity dependent flow control unit 126 and allow the fluid to pass into fluid filled portion 134. Increased pressure in fluid filled portion 134 can cause floating piston 128 to move upward and pressurize gas filled portion 132 ultimately causing lower body portion 102 to retract out of main damper portion 104. One-way valve 142 and the one-way valve 146 can be check valves. During the compression event, the pressure in fluid filled portion 134 can cause one-way valve 146 to stay closed. In one embodiment, air shock 100 can include a spring or coil spring to provide additional rebound force during the rebound event.

Prior solutions may include one additional gas chamber in extra volume reservoir 106. Embodiments of the present invention can include two additional chambers separated by a fixed velocity dependent flow control unit. Additionally, the two additional chambers of the present invention can have fluid filled portions adjacent to one another that are separated by a velocity dependent flow control unit. Each of the two additional chambers can have gas filled portions separated from the fluid filled portions by floating pistons. The fluid in the fluid filled portions flows through the velocity dependent flow control unit as the floating pistons move. Prior solutions may not include a velocity dependent flow control unit, two additional chambers, and two distinct gas filled portions separated by fluid filled portions.

In one embodiment, velocity dependent flow control unit 126 with compression pathway 140, one-way valve 142, rebound pathway 144, and one-way valve 146 control the flow rate of fluid between fluid filled portion 134 and fluid filled portion 136. The size and shape of compression pathway 140 and rebound pathway 144 can control the fluid flow rate. One-way valve 142 and one-way valve 146 can open based on an "opening pressure." It should be appreciated that one-way valve 142 and one-way valve 146 can have different opening pressures from one another. The fluid flow rate through velocity dependent flow control unit 126 during a compression event can be controlled by setting or changing the opening pressure of one-way valve 142. The fluid flow rate through velocity dependent flow control unit 126 during a rebound event can be controlled by setting or changing the opening pressure of one-way valve 146. In one embodiment, extra volume reservoir 106 can be disassembled and one-way valve 142 and/or one-way valve 146 can be changed for different valves with different opening pressures to control the fluid flow rate. In one embodiment, adjustment knob 112 can be used to adjust an opening pressure of one-way valve 142 and/or one-way valve 146. One-way valve 142 and/or one-way valve 146 can be bleedable and adjustment knob 112 can control a needle in contact with an orifice of the one-way valve. In one embodiment, the spring curves of the air shock can be adjusted by adjusting the volume of the main gas chamber. For example, the main gas chamber can be replaced or spaces can be added/removed from the main gas chamber.

Adjusting the spring curves of the air shock can considered "tuning" the spring curves. In other words, the spring curves of the air shock can be tunable. In one embodiment, an air shock with a velocity dependent flow control unit of the present invention can be tuned or designed for a specific application. For example, maximum speed for a lower body portion (lower body portion 102) moving past a piston (dampening fluid piston 107) and further penetrating into a main damper portion (main damper portion 104) can be measured and then one-way valve can be selected with an opening pressure such that maximum compression of the air shock is associated with the maximum speed. In one embodiment, a one-way valve can be selected with little to no opening pressure to be used during a rebound event to quickly and easily return fluid to a location from before the compression event. In one embodiment, a one-way valve used for a rebound direction of fluid flow is left unchecked.

It should be appreciated that velocity dependent flow control unit can have more than the two pathways depicted. Compression pathway 140 can be one of a plurality of compression pathways and rebound pathway 144 can be one of a plurality of rebound pathways. For example, velocity dependent flow control unit 126 can have three compression pathways and three rebound pathways for a total of six pathways. The three compression pathways can all be controlled by the same one-way valve or by individual one-way valves. The three rebound pathways can all be controlled by the same one-way valve or by individual one-way valves.

During a compression event, the controlled flow rate of the fluid through velocity dependent flow control unit 126 can cause gas filled portion 138 to be compressed at a different rate than the compression of gas filled portion 132 and main gas chamber 105. The rebound fluid flow rate through velocity dependent flow control unit 126 can also cause differences in the decompression of gas filled portion 138 and gas filled portion 132 with main gas chamber 105. These differences in fluid flow rate in the velocity dependent flow control unit, the differences of compression in the gas filled portions, and the differences in the decompression of the gas filled portion during rebound can cause the air shock to have two different spring curves. The different spring curves are dependent upon the velocity in which lower body portion 102 moves past dampening fluid piston 107 and travels into main damper portion 104. It should be appreciated that the fluid described herein can be oil or other types of non-compressible fluid. It should be appreciated that that the gas in the gas filled portions and chambers described herein can be compressible and can be any gas including air and nitrogen.

Figure 3:
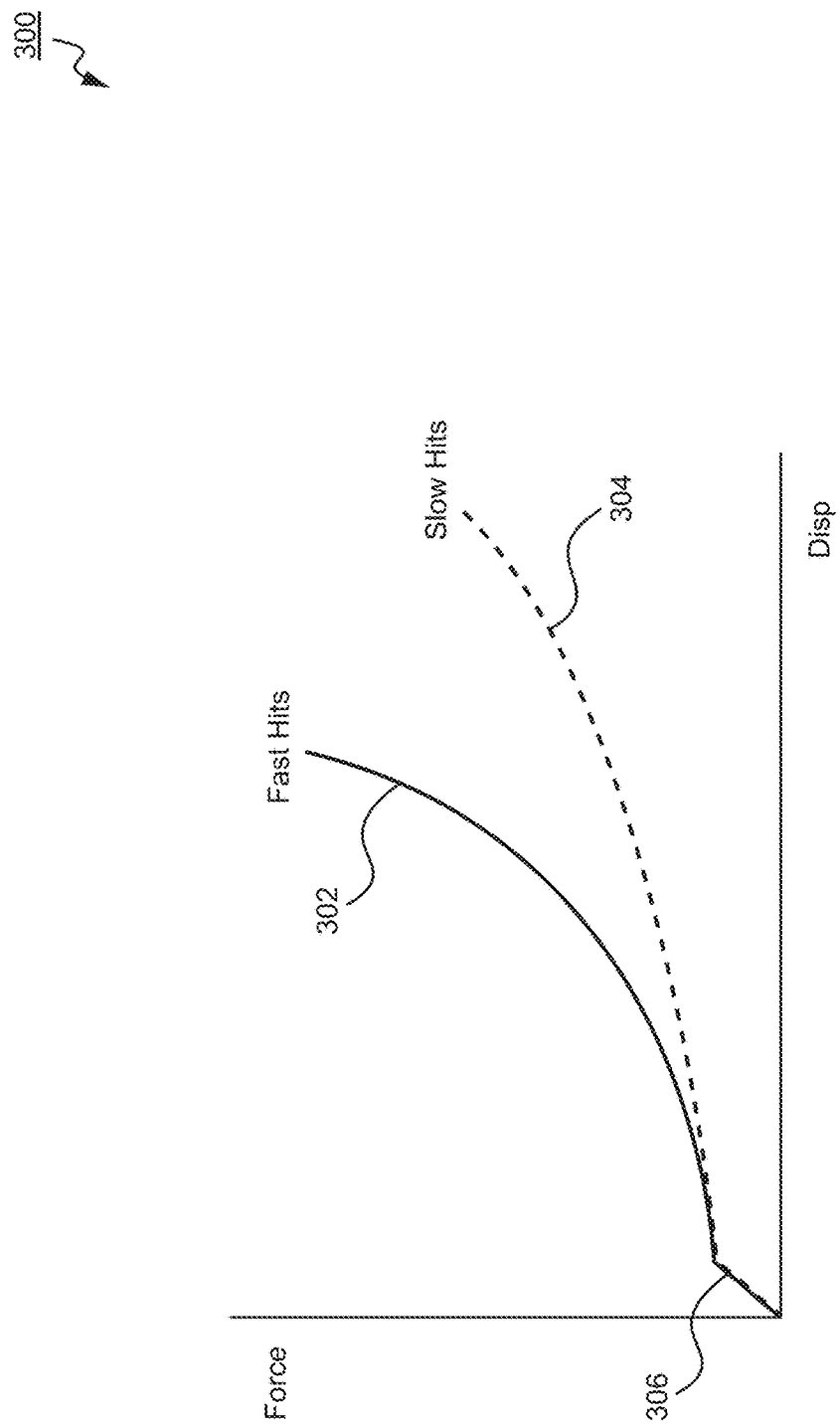
FIG. 3 is a graph of the spring curves of an air shock with a velocity dependent flow control unit, in accordance with an embodiment.

With reference now to FIG. 3, a graph 300 of the spring curves of an air shock with a velocity dependent flow control unit. Graph 300 depicts results of the spring curves with force as a function of displacement. Curve 302 depicts a curve that is a progressive spring curve. Curve 302 depicts a spring curve that occurs in the present invention during a high velocity impact or a fast hit. In one embodiment, the high velocity of the piston traveling into the main gas chamber of the air shock occurs at a rate that is faster than the fluid that flows through the velocity dependent flow control unit resulting in the gas filled portion (138 of FIG. 2) of the additional chamber past the velocity dependent flow control unit not being compressed at the same rate as the main chamber and gas filled portion (132 of FIG. 2) of the additional chamber before the velocity dependent flow control unit. Thus, the air shock does not "experience" the combined volume of gas filled portion 132 and gas filled portion 138 and curve 302 has a progressive curve. This progressive curve of curve 302 can be desirable for a bigger impact such as landing a jump while operating a snowmobile.

Curve 304 depicts a curve that is more linear in shape as compared to curve 302. Curve 304 depicts a spring curve that occurs in the present invention during a low velocity impact or a slow hit. In one embodiment, the low velocity of the piston traveling into the main gas chamber of the air shock occurs at a rate that is slower than the fluid that flows through the velocity dependent flow control unit resulting in the gas filled portion (138 of FIG. 2) of the additional chamber past the velocity dependent flow control unit being compressed at a similar rate as the main chamber and gas filled portion (132 of FIG. 2) of the additional chamber before the velocity dependent flow control unit. Thus, the air shock "experiences" the combined volume of gas filled portion 132 and gas filled portion 138 and curve 304 is more linear than curve 302. This more linear curve 304 can be desirable for smaller impacts such as chatter on a washboard road. This more linear curve 304 can be desirable for a high displacement event that occurs at a slow velocity. For example, while side-hilling on a snowmobile, a user can experience a low velocity high displacement event that can cause the snowmobile to roll over if the spring curve is progressive such as curve 302. This is prevented in embodiments of the present invention which because a low velocity high displacement event would invoke the spring curve of curve 304 which is more linear and may prevent a potential rollover. In prior solutions, a spring curve for an air shock that is position based can cause a progressive curve during a low velocity high displacement event because of the high displacement invokes the position based change in spring curve.

Slope 306 of graph 300 depicts an embodiment where the fluid does not rebound to an original position quick enough. This can be caused by a one-way valve rebound valve in the velocity dependent flow control unit that has too high of an opening pressure.

Figure 4A:
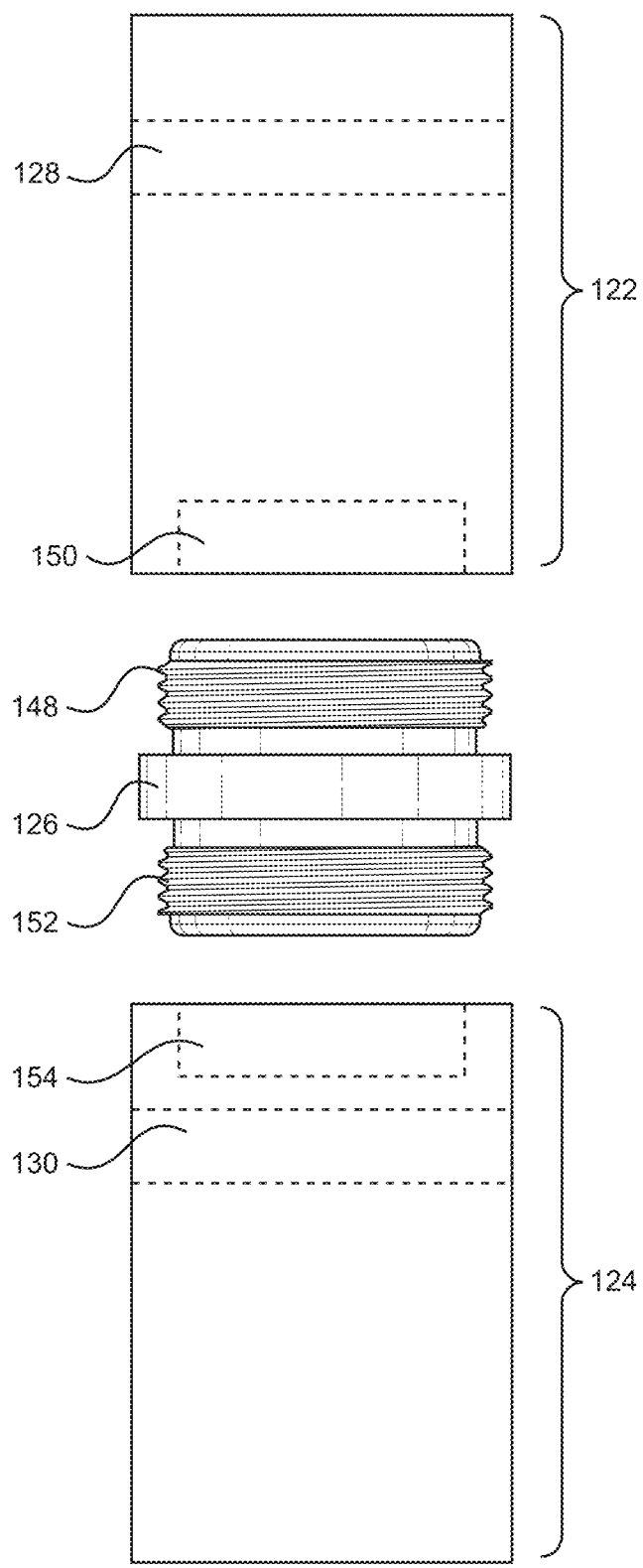
FIG. 4A, an exploded side view of the components of a reservoir, in accordance with an embodiment.

With reference now to FIG. 4A, an exploded side view of the components of extra volume reservoir 106. Velocity dependent flow control unit 126 can include a first connector 148 that can couple with receiver 150 of first additional chamber 122. A second connector 152 of velocity dependent flow control unit 126 can couple with a receiver 154 of second additional chamber 124. First connector 148, receive 150, second connector 152, and receive 154 can be threaded to form a fluid and gas tight seal once coupled. It should be appreciated that first additional chamber 122 and second additional chamber 124 can be off the shelf chambers used by other shock or suspensions systems and velocity dependent flow control unit 126 can be designed with threaded connectors to couple with the off the shelf chambers. Thus, embodiments of the present invention can be implemented into existing air shock systems and assemblies. For example, an existing air shock can that has one additional chamber can be retrofitted with the present invention by remove the reservoir and installing an elongated reservoir that can house two additional chambers with a velocity dependent flow control unit in between.

Figure 4B:
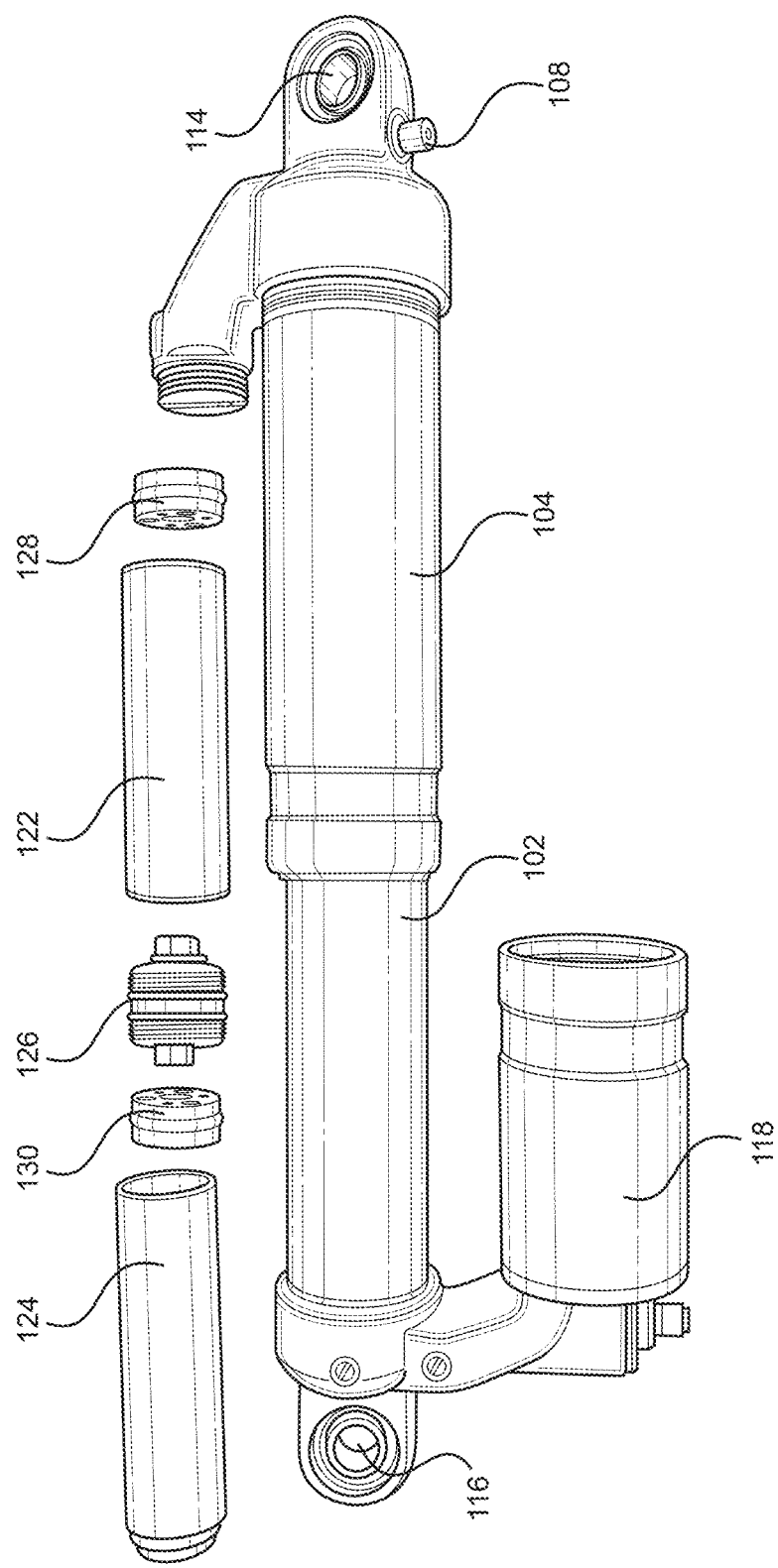
FIG. 4B, a partially exploded side view of an air shock, in accordance with an embodiment.

With reference now to FIG. 4B, a partially exploded side view of air shock 100.

Figure 5:
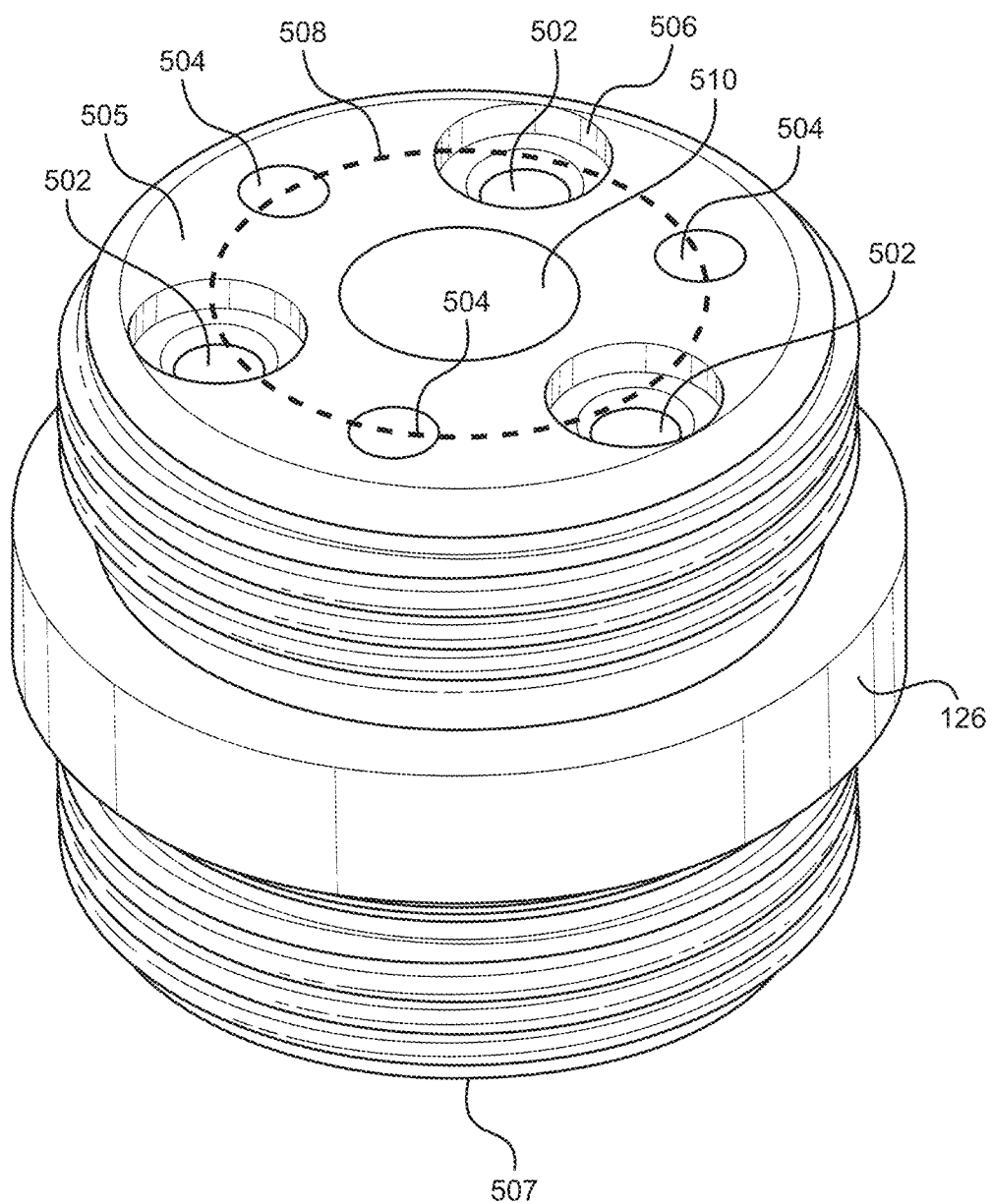
FIG. 5 is a perspective view of a velocity dependent flow control unit, in accordance with an embodiment.

With reference now to FIG. 5, a perspective view of velocity dependent flow control unit 126. FIG. 5 depicts compression pathways 502 and rebound pathways 504 each having an opening on surface 505. Each of compression pathways 502 and rebound pathways 504 can extend through velocity dependent flow control unit 126 and have an opening on a surface 507 facing in an opposite direction of surface 505. Compression pathways 502 and rebound pathways 504 are depicted as having three pathways each, it should be appreciated that any number of pathways can be employed. Counterbore 506 is depicted as an enlarged opening for one of compression pathways 502 at surface 505. Each of compression pathways 502 can have a counterbore at surface 505 that is larger than the openings for rebound pathways 504. A one-way valve can cover rebound pathways 504 when closed and partially cover compression pathways 502 when closed. The counterbores of compression pathways 502 ensure that the one-way valve will not completely cover compression pathways 502 when the one-way valve is closed. On surface 507 opposite of surface 505, the openings for rebound pathways 504 can have counterbores with larger openings as compared to the openings of compression pathways 502. This can allow a one-way valve at surface 507 to partially cover the counterbores of rebound pathways 504 when the one-way valve at surface 507 is closed and completely cover the openings for compression pathways 502 when closed.

In one embodiment, compression pathways 502 and rebound pathways 504 are laid out on a through hole 508 about surface 505. This circular pattern can allow a circular shaped one-way valve to cover rebound pathways 504 and partially cover the counterbores of compression pathways 502. Through hole 508 can be employed to allow a bolt to pass through velocity dependent flow control unit 126 and fasten a one-way valve to each of surface 505 and surface 507.

Figure 6:
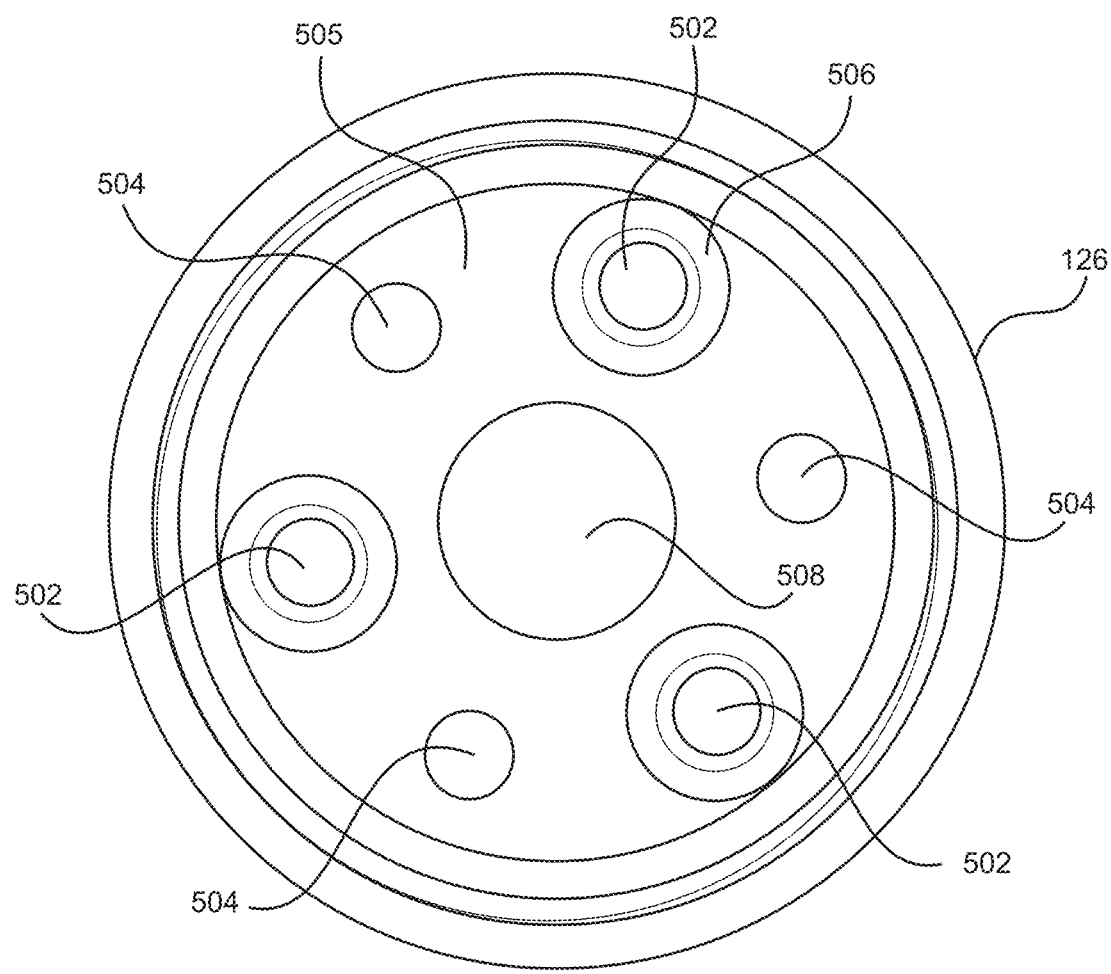
FIG. 6 is a top view of a velocity dependent flow control unit, in accordance with an embodiment.
Figure 7:
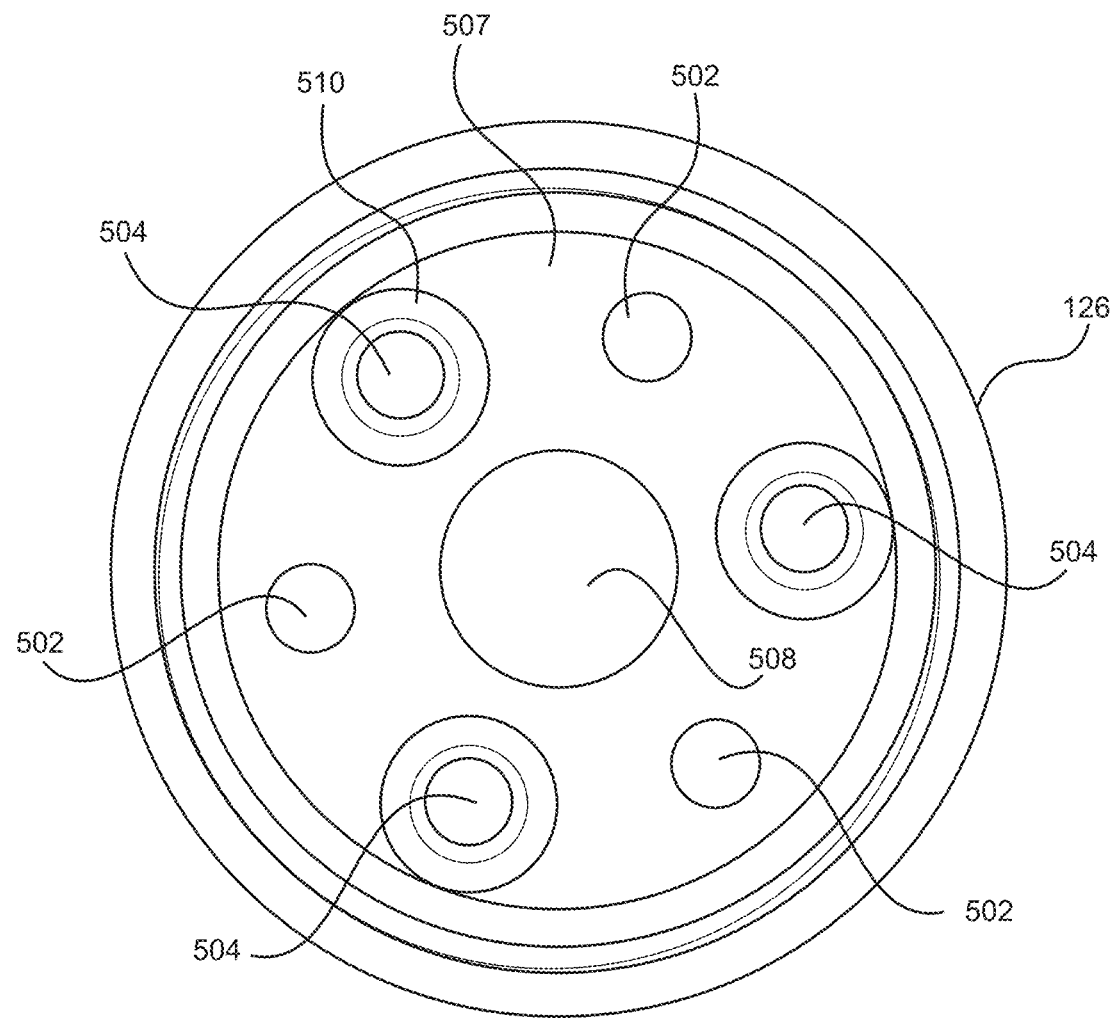
FIG. 7 is a bottom view of a velocity dependent flow control unit, in accordance with an embodiment.

With reference now to FIG. 6, a top view of surface 505 of velocity dependent flow control unit 126. With reference now to FIG. 7, a bottom view of surface 507 of velocity dependent flow control unit 126. FIG. 7 depicts counterbore 510 on surface 507 of at least one of rebound pathways 504.

Figure 8:
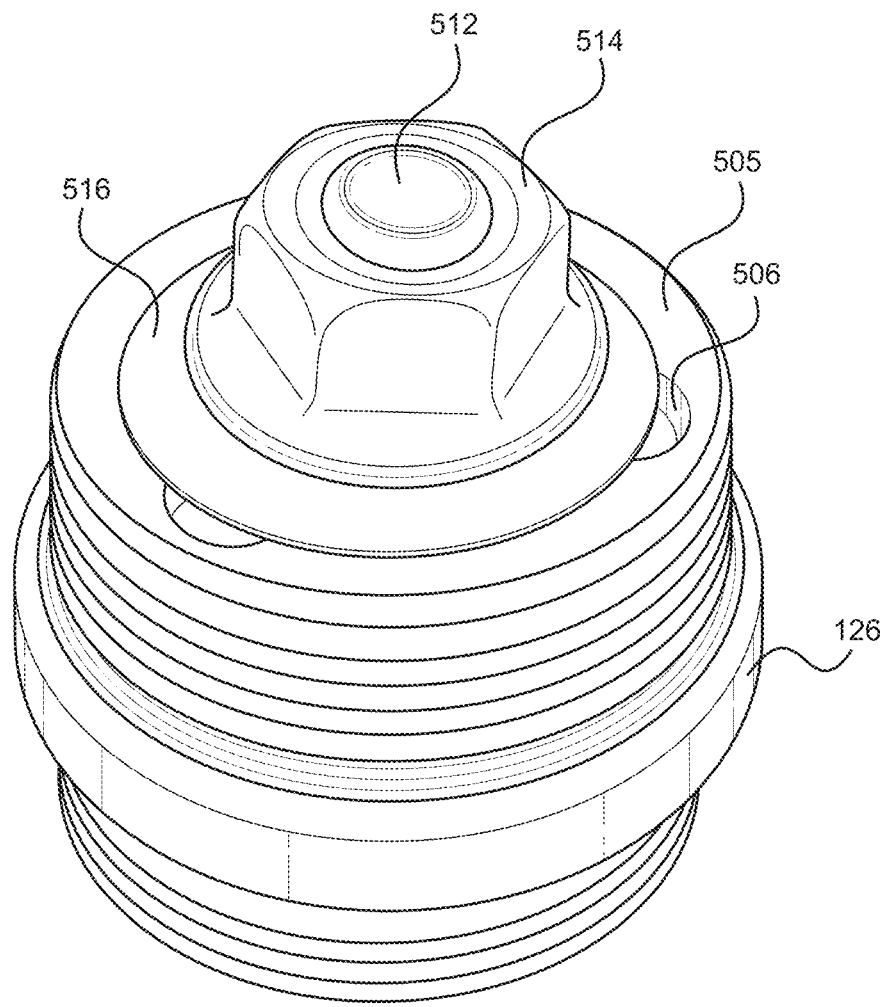
FIG. 8 is a top perspective view of a velocity dependent flow control unit with a one-way valve, in accordance with an embodiment.

With reference now to FIG. 8, a top perspective view of velocity dependent flow control unit 126 with one-way valve 516 closed on surface 505. One-way valve 516 is depicted as being circular and covering rebound pathways 504 while partially exposing counterbores of compression pathways 502 such as counterbore 506. Bolt 512 is depicted as extending out of through hole 508 and being fastened via nut 514 to hold one-way valve 516 against surface 505. In one embodiment, one-way valve 516 comprises a shim stack of at least one shim.

Figure 9:
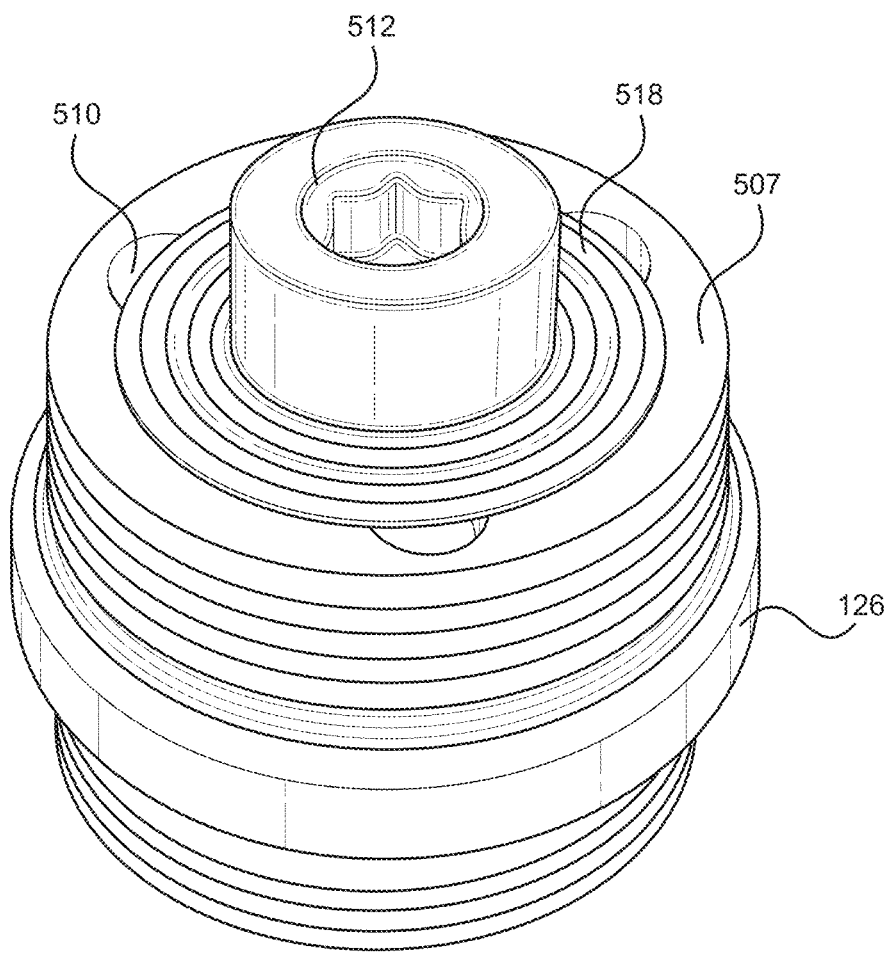
FIG. 9 is a bottom perspective view of a velocity dependent flow control unit with a one-way valve, in accordance with an embodiment.

With reference now to FIG. 9, a bottom perspective view of velocity dependent flow control unit 126 with one-way valve 518 closed on surface 507. One-way valve 518 is depicted as being circular and covering compression pathways 502 while partially exposing counterbores of rebound pathways 504 such as counterbore 510. Bolt 512 is depicted as extending out of through hole 508 and holding one-way valve 518 against surface 507. In one embodiment, one-way valve 518 comprises a shim stack of a plurality of shims.

Figure 10:
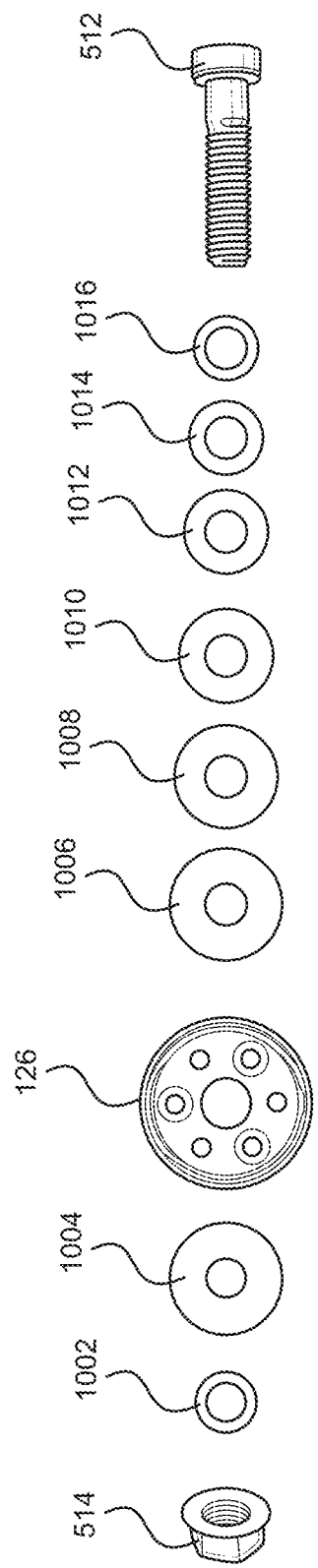
FIG. 10 is an exploded view of a velocity dependent flow control unit with two one-way valves, in accordance with an embodiment.

With reference now to FIG. 10, an exploded view of velocity dependent flow control unit 126 with one-way valve 516 and one-way valve 518. FIG. 10 depicts shims 1002 and 1004 which fastened to surface 505 of velocity dependent flow control unit 126 to form a shim stack for one-way valve 516. Shims 1006, 1008, 1010, 1012, 1014, and 1016 which fastened to surface 507 of velocity dependent flow control unit 126 to form a shim stack for one-way valve 518. It should be appreciated that a shim stack for a one-way valve can include any number of shims and can include different types of shims with different amounts of flexibility and different shapes. In an alternative embodiment, a one-way valve can include a spring that can keep or return the one-way valve to a closed position and an opening pressure can overcome the force of the spring to open the one-way valve. In one embodiment, a velocity dependent flow control unit of the present invention can include a shim stack one-way valve on one surface and a spring one-way valve on an opposite surface or can include two spring one-way valves.

Figure 11:
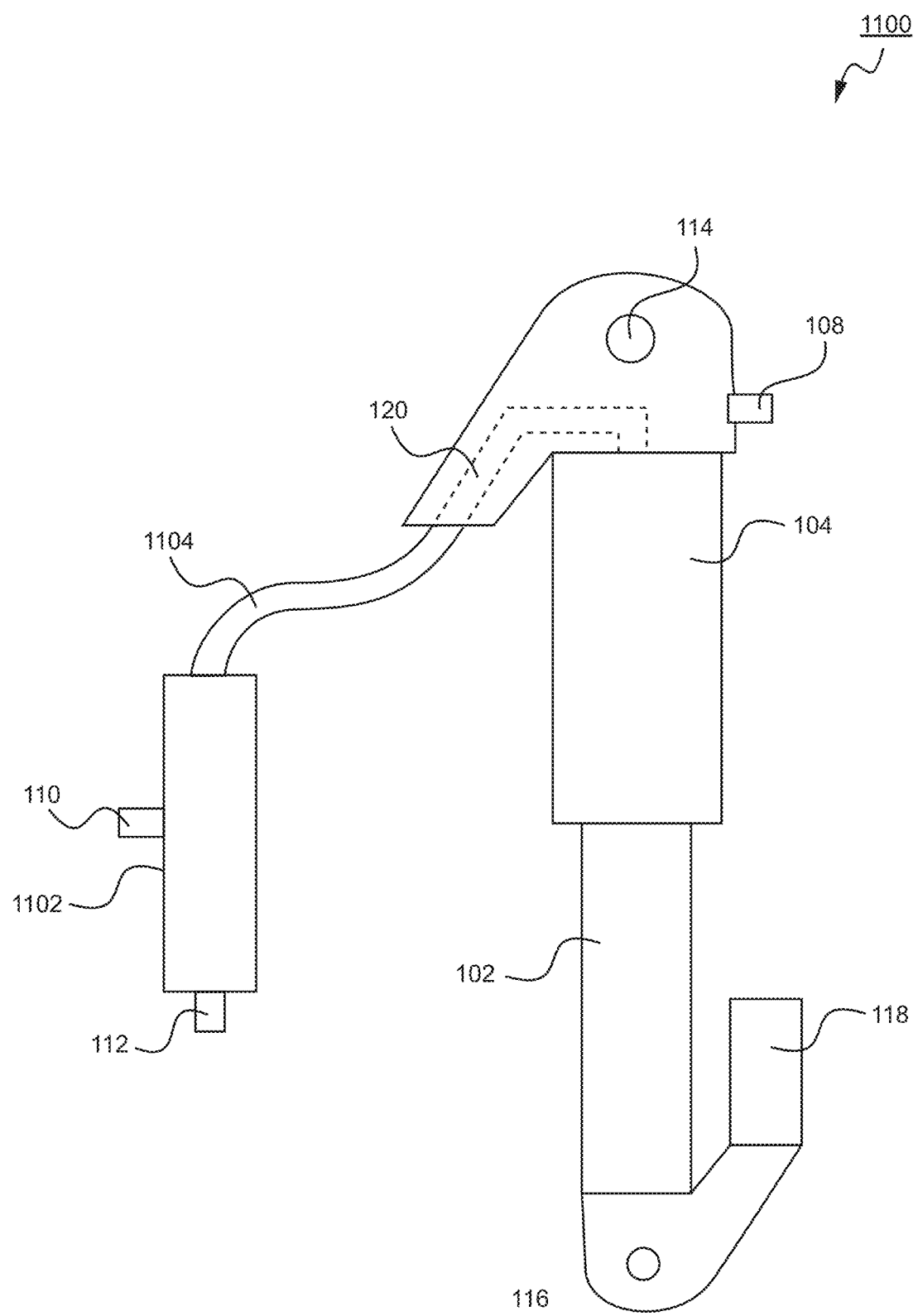
FIG. 11 is a side view of an air shock, in accordance with an embodiment.

With reference now to FIG. 11, a side view of an air shock 1100. Air shock 1100 can include a remote reservoir 1102 of the present invention with a velocity dependent flow control unit. Remote reservoir 1102 can be located physically remote from main gas chamber 105. Remote reservoir 1102 can be in fluid communication with main gas chamber 105 via hose 1104. Remote reservoir 1102 with hose 1104 can allow for unique and varied mounting configuration to install air shock 1100 on various vehicles with various different sized spaces available for suspension mounting.

It should be appreciated that embodiments of the present invention are well suited to be used in conjunction with other air shock technology. For example, an air shock may include anti-bottoming out control features that can be used with the present invention without interfering with the benefits of velocity dependent spring curves. The present invention can also be used with position sensitive dampers that can measure pressure and increase damping force accordingly.

Figure 12:
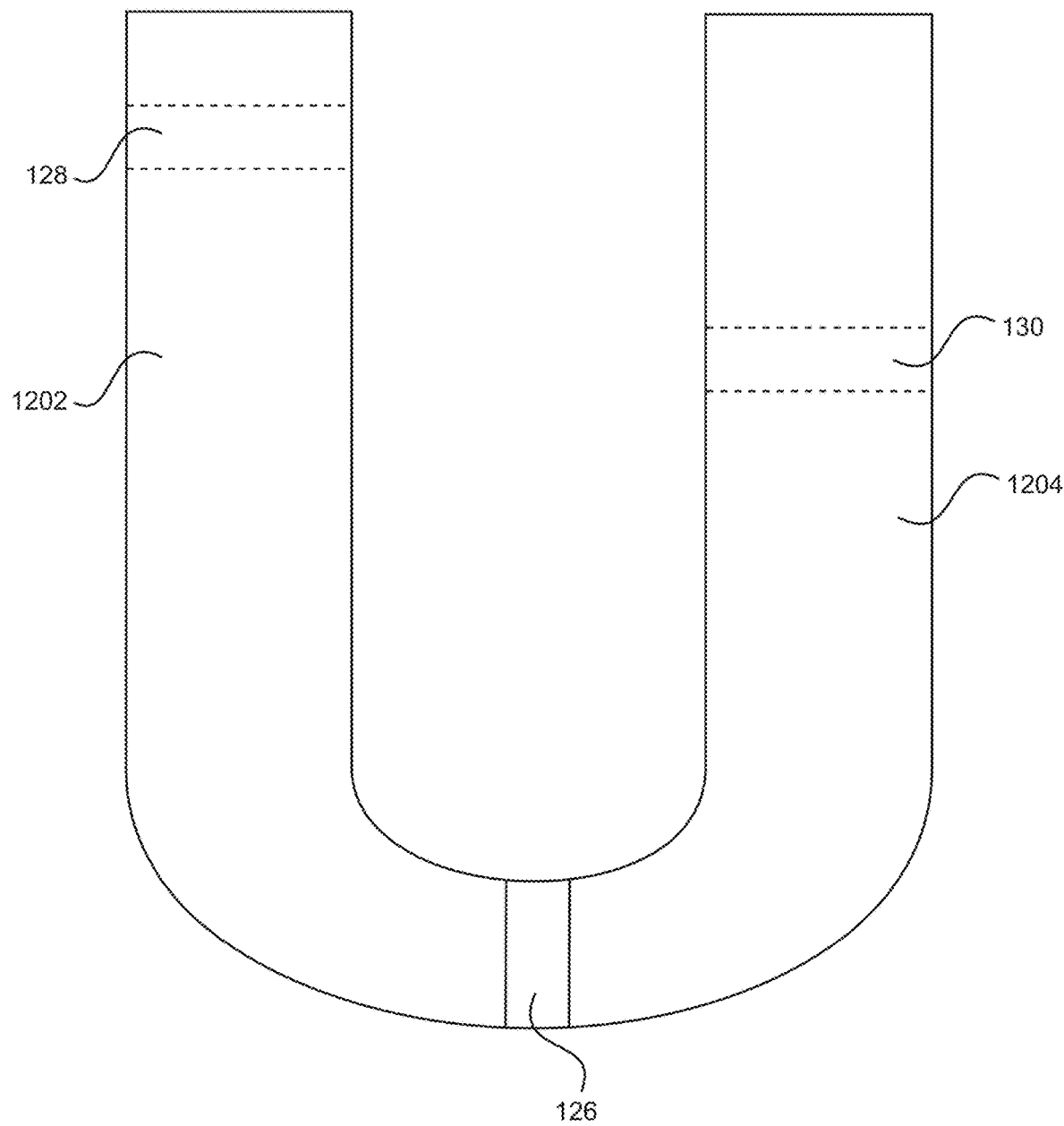
FIG. 12 is a side view of a U shaped configuration, in accordance with an embodiment.

With reference now to FIG. 12, a side view of a first additional chamber 1202, a second additional chamber 1204, and a velocity dependent flow control unit 126 that form a U shaped configuration. It should be appreciated that embodiments of the present invention can include additional chambers that are formed into various shapes, such as the depicted U shape, to fit in different spaces of different shaped vehicles.

Figure 13:
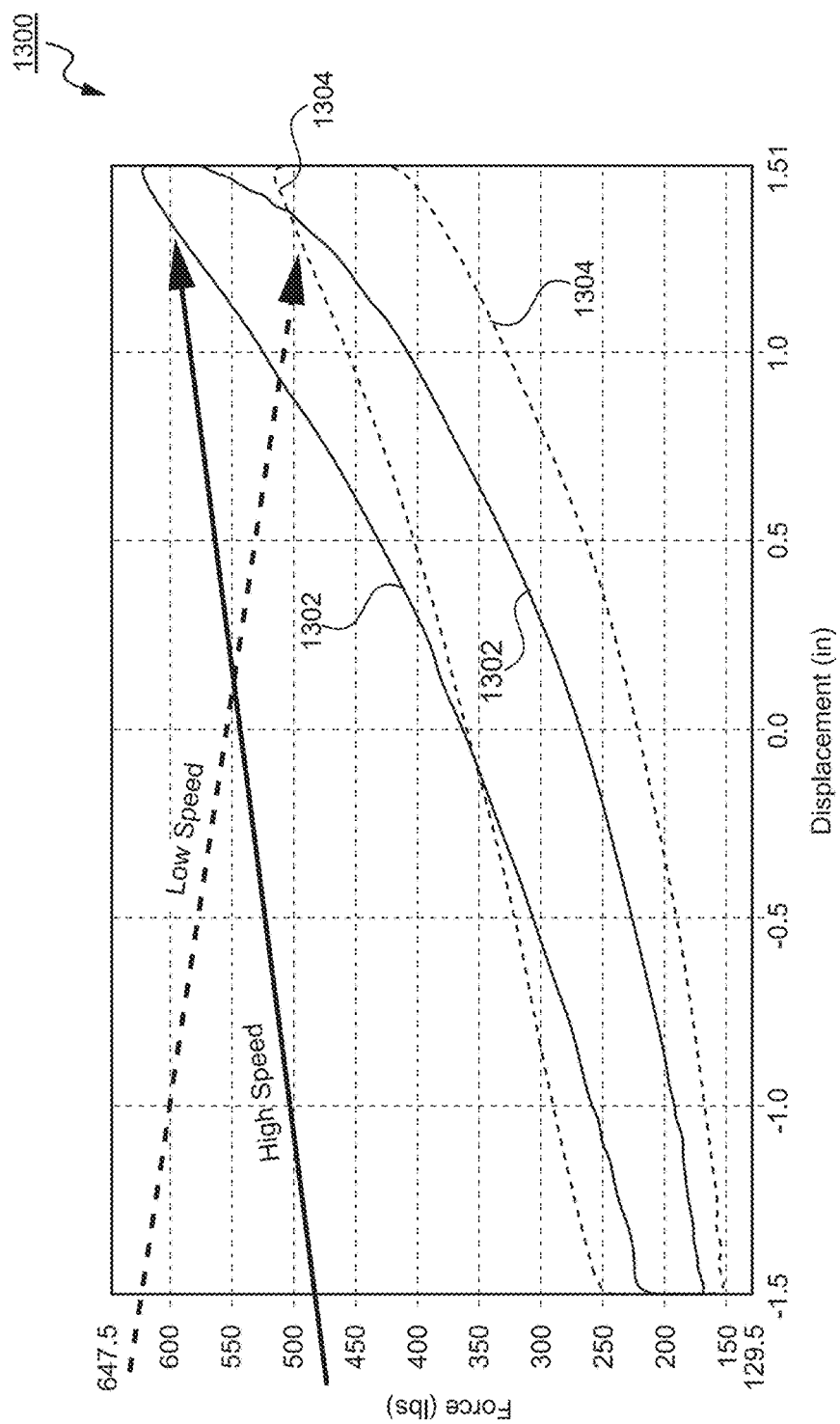
FIG. 13 is a graph which depicts spring curves, in accordance with an embodiment.

With reference now to FIG. 13, a graph 1300 which depicts spring curves 1302 and spring curves 1304 that are results of testing an air shock with a velocity dependent flow control unit of the present invention. Graph 1300 shows force as a function of displacement. Spring curves 1302 depict the results of high velocity or high speed impacts such that a lower body portion of the air shock was displaced at a high velocity relative to a dampening fluid piston while traveling into a main damper portion. Spring curves 1304 depict the results of low velocity or low speed impacts, as compared to the high velocity impacts of spring curves 1303, such that the piston of the air shock was displaced at a low velocity while traveling into the main gas chamber. Spring curves 1302 depict curves that represents a progressive spring curve which can be desirable for a high velocity displacement of the piston. Spring curves 1302 depict curves that are more linear as compared to spring curves 1304. The more linear curves of spring curves 1304 can be desirable for low velocity displacement of the piston.

Figure 14:
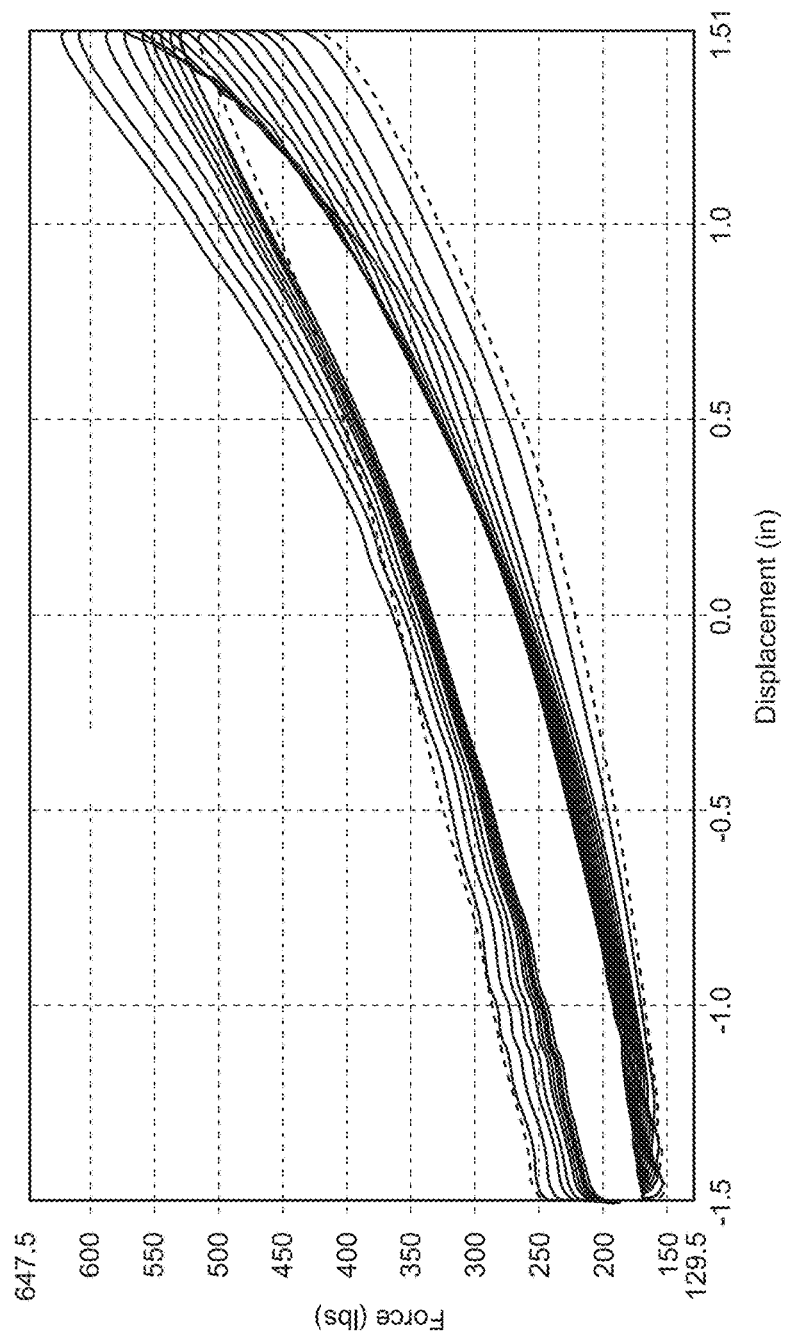
FIG. 14 is a graph which depicts spring curves at different speeds, in accordance with an embodiment.

With reference now to FIG. 14, a graph 1400 which depicts spring curves that are results of testing an air shock with a velocity dependent flow control unit of the present invention at different speeds of impact.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, the examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims and their equivalents.

What I claim is:

1. A velocity dependent compression flow control unit with a main body comprising:
    a compression fluid pathway to allow a fluid to pass into a first opening in a first surface of said main body, through said main body, and out of a second opening in a second surface of said main body, wherein said first surface is facing an opposite direction of said second surface;
    a first one-way valve over said second opening of said compression fluid pathway in said second surface;
    a first connector to connect and fix said first surface of said main body to a first additional chamber of an air shock;
    a second connector to connect and fix said second surface of said main body to a second additional chamber of said air shock; and
    wherein a spring curve of said air shock is dependent upon a velocity of a compression of said air shock and is controlled by a flow rate of said fluid passing through: said first additional chamber, said velocity dependent compression flow control unit, and said second additional chamber.

2. The velocity dependent compression flow control unit of claim 1, wherein said flow rate of said fluid between said first additional chamber and said second additional chamber is adjustable by adjusting a structure of said velocity dependent compression flow control unit including adjusting: a size of said compression fluid pathway, an opening pressure of said first valve, or adjusting both of said size of said compression fluid pathway and said opening pressure of said first valve.

3. The velocity dependent compression flow control unit of claim 1, further comprising:
    an adjustment knob for changing a structure of said velocity dependent compression flow control unit to adjust said flow rate of said fluid between said first additional chamber and said second additional chamber.

4. The velocity dependent compression flow control unit of claim 1, wherein said first valve comprises a shim stack with at least one shim.

5. The velocity dependent compression flow control unit of claim 1, wherein said first valve comprises a spring and at least one shim.

6. The velocity dependent compression flow control unit of claim 1, wherein said compression fluid pathway is one of a plurality of compression fluid pathways controlled by said velocity dependent compression flow control unit.

7. The velocity dependent compression flow control unit of claim 1, wherein said first opening is counterbored to be wider than said second opening.

8. The velocity dependent compression flow control unit of claim 1, further comprising:
    a rebound fluid pathway to allow said fluid to pass into a third opening in said second surface of said main body, through said main body, and out of a fourth opening in said first surface of said main body; and a second one-way valve over said fourth opening of said rebound fluid pathway in said first surface of said main body.

9. The velocity dependent compression flow control unit of claim 8, wherein an opening pressure of said first valve is different than an opening pressure of said second valve.

10. A velocity dependent rebound flow control unit with a main body comprising:
- a rebound fluid pathway to allow a fluid to pass into a first opening in a first surface of said main body, through said main body, and out of a second opening in a second surface of said main body, wherein said first surface is facing an opposite direction of said second surface;
- a first one-way valve over said second opening of said rebound fluid pathway in said second surface;
- a first connector to connect and fix said first surface of said main body to a first additional chamber of an air shock;
- a second connector to connect and fix said second surface of said main body to a second additional chamber of said air shock; and
- wherein a spring curve of said air shock is dependent upon a velocity of a rebound of said air shock and is controlled by a flow rate of said fluid passing through: said first additional chamber, said velocity dependent rebound flow control unit, and said second additional chamber.

11. The velocity dependent rebound flow control unit of claim 10, wherein said flow rate of said fluid between said first additional chamber and said second additional chamber is adjustable by adjusting a structure of said velocity dependent rebound flow control unit including adjusting: a size of said rebound fluid pathway, an opening pressure of said first valve, or adjusting both of said size of said rebound fluid pathway and said opening pressure of said first valve.

12. The velocity dependent rebound flow control unit of claim 10, further comprising:
- an adjustment knob for changing a structure of said velocity dependent rebound flow control unit to adjust said flow rate of said fluid between said first additional chamber and said second additional chamber.

13. The velocity dependent rebound flow control unit of claim 10, wherein said first valve comprises a shim stack with at least one shim.

14. The velocity dependent rebound flow control unit of claim 10, wherein said first valve comprises a spring and at least one shim.

15. The velocity dependent rebound flow control unit of claim 10, wherein said rebound fluid pathway is one of a plurality of rebound fluid pathways controlled by said velocity dependent rebound flow control unit.

16. The velocity dependent rebound flow control unit of claim 10, wherein said first opening is counterbored to be wider than said second opening.

17. The velocity dependent rebound flow control unit of claim 10, further comprising:
- a compression fluid pathway to allow said fluid to pass into a third opening in said second surface of said main body, through said main body, and out of a fourth opening in said first surface of said main body; and
- a second one-way valve over said fourth opening of said compression fluid pathway in said first surface of said main body.

18. The velocity dependent rebound flow control unit of claim 17, wherein an opening pressure of said first valve is different than an opening pressure of said second valve.

19. A reservoir for an air shock, comprising:
- a first additional chamber comprising:
    - a first floating piston that movably seals a fluid filled portion from a gas filled portion of said first additional chamber, wherein said gas filled portion of said first additional chamber is in fluid communication with a main gas chamber of said air shock;
- a second additional chamber comprising:
    - a second floating piston that movably seals a fluid filled portion from a gas filled portion of said second additional chamber;
- a velocity dependent compression flow control unit with a main body, wherein said velocity dependent compression flow control unit is coupled to and fixed between said first additional chamber and said second additional chamber, said velocity dependent compression flow control unit comprising:
    - a compression fluid pathway to allow a fluid communication between said fluid filled portion of said first additional chamber and said fluid filled portion of said second additional chamber; and
    - a first one-way valve over said compression fluid pathway in said second additional chamber; and
- wherein a spring curve of said air shock is dependent upon a velocity of a compression of said air shock and is controlled by a flow rate of said fluid passing through: said first additional chamber, said velocity dependent compression flow control unit, and said second additional chamber.

20. The reservoir of claim 19, further comprising:
- a rebound fluid pathway to allow a fluid communication between said fluid filled portion of said first additional chamber and said fluid filled portion of said second additional chamber; and
- a second one-way valve over said rebound fluid pathway in said first additional chamber.

* * * * *